May 25, 1943. E. E. McMAHAN ET AL Re. 22,323

MECHANICAL POULTRY PICKER

Original Filed Dec. 13, 1939 4 Sheets-Sheet 1

INVENTORS
Eddy E. McMahan
Antoine Charlebois

BY G. Wright Arnold
ATTORNEY.

May 25, 1943. E. E. McMAHAN ET AL Re. 22,323

MECHANICAL POULTRY PICKER

Original Filed Dec. 13, 1939 4 Sheets-Sheet 2

Eddy E. McMahan
Antoine Charlebois
INVENTORS

BY

G. Wright Arnold
ATTORNEY

May 25, 1943. E. E. McMAHAN ET AL Re. 22,323

MECHANICAL POULTRY PICKER

Original Filed Dec. 13, 1939 4 Sheets-Sheet 3

INVENTORS
Eddy E. McMahan
Antoine Charlebois

BY G. Wright Arnold
ATTORNEY.

May 25, 1943. E. E. McMAHAN ET AL Re. 22,323
MECHANICAL POULTRY PICKER
Original Filed Dec. 13, 1939 4 Sheets-Sheet 4
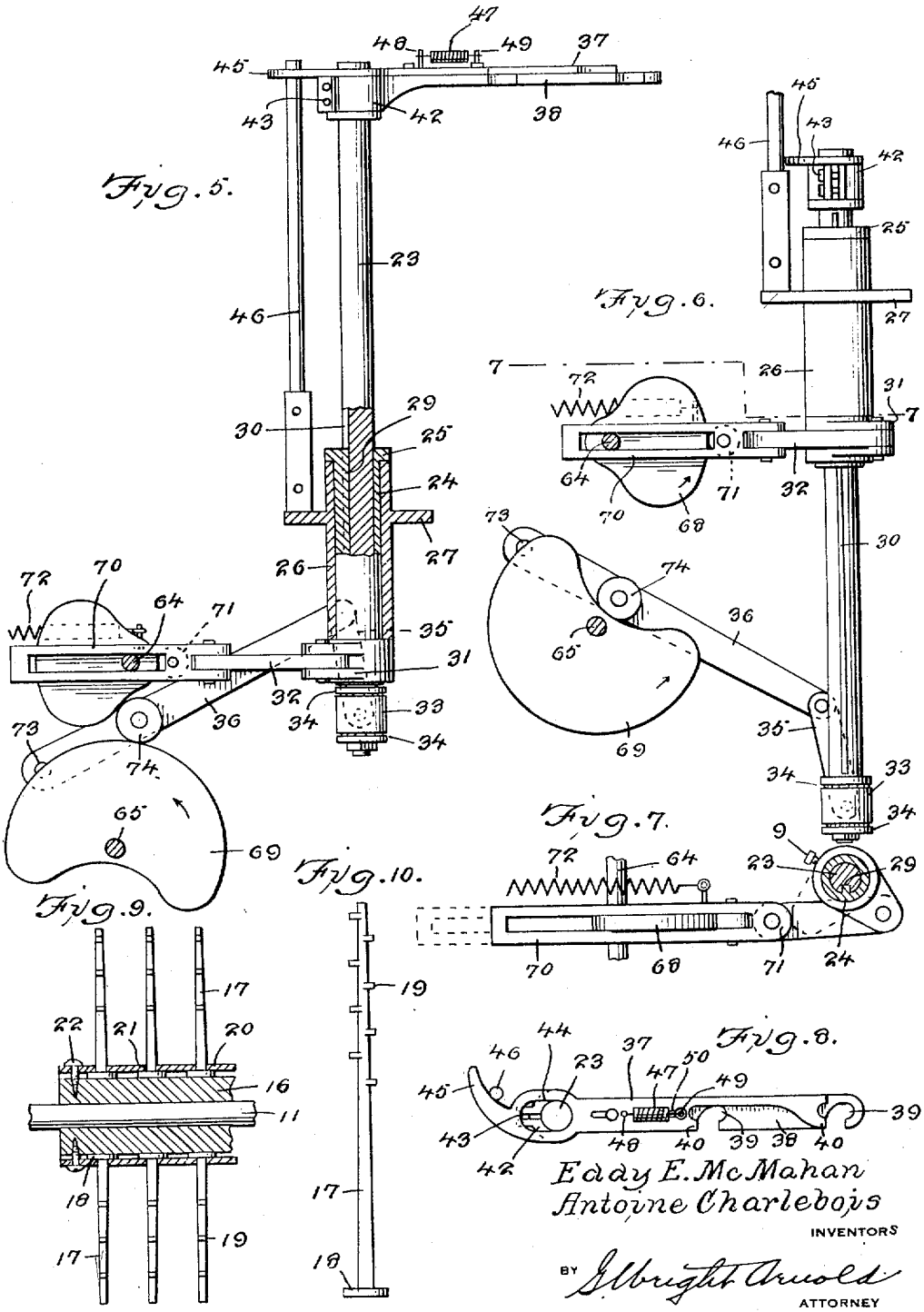
Eddy E. McMahan
Antoine Charlebois
INVENTORS
BY Albright Arnold
ATTORNEY Reissued May 25, 1943 Re. 22,323

UNITED STATES PATENT OFFICE 22,323

MECHANICAL POULTRY PICKER

Eddy E. McMahan, Los Angeles, Calif., and Antoine Charlebois, Bellingham, Wash.; said Eddy E. McMahan assignor to Ward D. McMahan, Port Angeles, Wash.

Original No. 2,235,619, dated March 18, 1941, Serial No. 309,088, December 13, 1939. Application for reissue March 14, 1942, Serial No. 434,694

8 Claims. (Cl. 17—11.1)

This invention relates to a mechanical poultry picker and has for an object to provide a device of this character having rotating drums provided with radially disposed rubber fingers adapted to impinge against poultry and strip the feathers therefrom during a single operation of dipping the poultry between the drum.

A further object is to provide a device of this character in which poultry is held by the legs and hangs head downward from a clamp carried by a shaft mounted for vertical movement to quickly lower and raise the poultry relatively to the feather stripping drums, the shaft also having rotary movement on its axis through an arc of 90° at its upper limit of movement to permit the clamp to be swung to the side of the machine for replacing stripped poultry with poultry to be de-feathered.

A further object is to provide a device of this character having simplified mechanism for actuating and timing the movement of the shaft and clamp.

A further object is to provide a device of this character having a novel poultry clamp comprising two superposed arms, the upper arm being movable endwise with respect to the lower arm, the lower arm having slots and the upper arm having hooks coacting with the slots to clamp the legs of poultry.

A further object is to provide a device of this character which will be formed of a few strong simple and durable parts, which will be inexpensive to manufacture, and which will not easily get out of order.

With the above and other objects in view, the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification:

Figure 5 is a detail vertical sectional view showing the cams for respectively moving the shaft vertically and turning the shaft axially through an arc of 90°.

Figure 6 is a detail view in elevation showing the cams turned oppositely to the position shown in Figure 5.

Figure 7 is a detail transverse sectional view taken on the line 7—7 of Figure 6, showing the shaft rotating mechanism in top plan.

Figure 8 is a plan view of the poultry clamp in open position.

Figure 9 is a detail cross sectional view of one of the stripping rollers showing the rubber stripping fingers.

Figure 10 is a side elevation of one of the stripping fingers.

Figure 1:
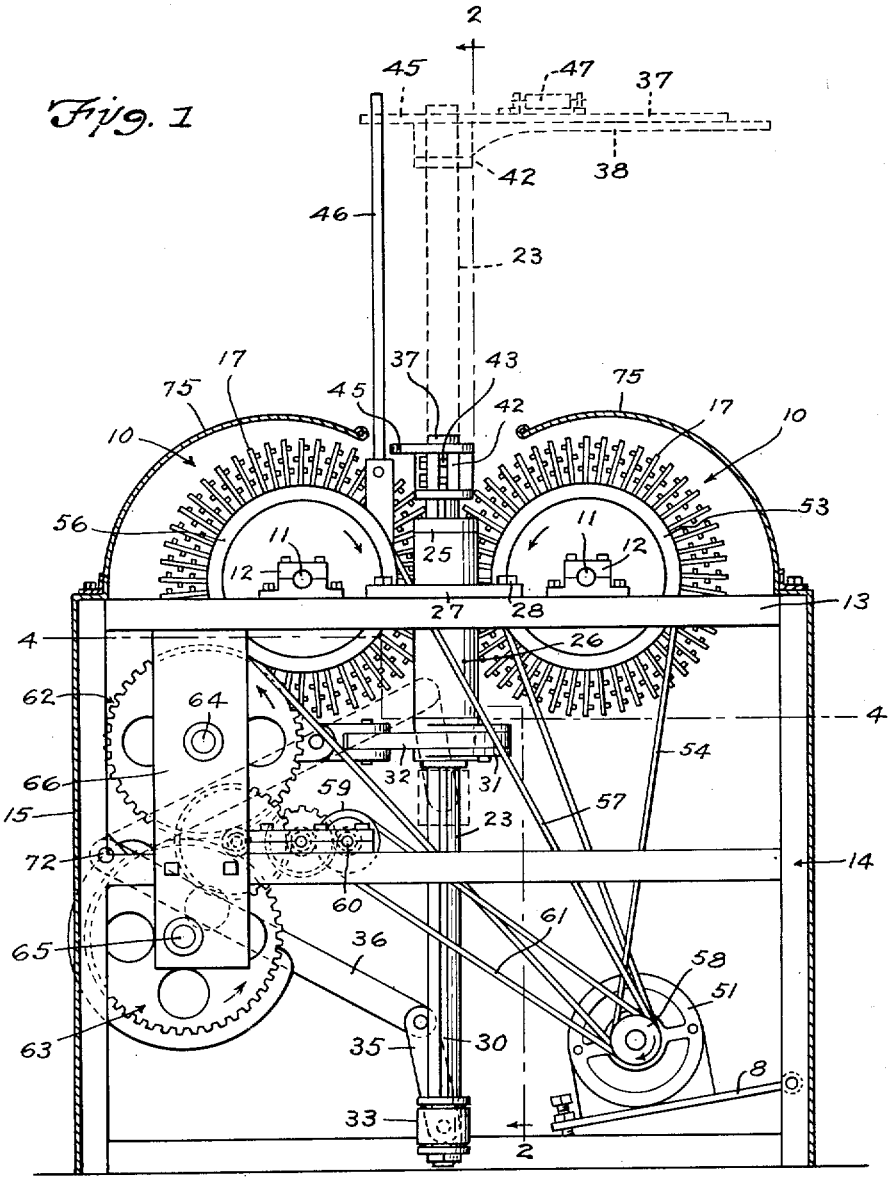
Figure 1 is a side elevation of a mechanical poultry picker constructed in accordance with the invention and showing the shaft and clamp in lowered operative position in full lines and in raised and swung laterally position in dotted lines.

Referring now to the drawings in which like characters of reference designate similar parts in the various views, 10 designates a pair of stripping drums mounted on respective shafts 11 carried by bearings 12 which are secured to the upper horizontal bars 13 of a frame 14 which may be formed of angle iron material and supports walls 15 which form a casing or housing for the operating mechanism and the lower portions of the stripping drums.

As best shown in Figure 9, each stripping drum comprises a cylindrical hub 16 which is secured to the shaft 11. A plurality of rubber fingers 17 are disposed to extend laterally from the hub, each finger having a disk head 18 and a plurality of laterally disposed projections 19. The heads of all of the fingers are clamped to the hub 16 by a cylindrical shell 20 having openings 21 to receive the fingers. The shell is secured to the hub by screws 22 or other connectors The stripping drums are rotated toward each other and the stripping fingers are moved in a path in close proximity to each other without interdigitating. Thus, when poultry is dipped between the drums the fingers will impinge against the feathers and yield sufficiently to conform to the contour of the poultry while forcefully beating the feathers off the poultry, this beating action being assisted by the projections 19 of the fingers which extend over all the feathered area and effectively de-feather the poultry.

For raising and lowering poultry relatively to the stripping drums a vertically disposed shaft 23, best shown in Figure 5, has a sleeve 24 mounted thereon and provided at the upper end with a head 25 which is supported on the upper end of a tubular bearing 26 in which the sleeve is rotatably mounted. The bearing is provided with a flange 27 which is bolted to the frame as shown at 28 in Figure 1. The sleeve is provided with a longitudinal spline 29, shown also in Figure 7, which enters a longitudinal groove 30 in the shaft, shown best in Figure 6, and permits the shaft to be moved vertically up and down in the sleeve and to be rotated on its axis when the sleeve is rotated in the bearing.

The sleeve is secured at the bottom to a crank arm 31 by a set screw 9. A link 32 is connected to the crank arm and is cam actuated, as will be presently described, to turn the sleeve axially through an arc of 90° alternately with the raising and the lowering of the shaft. The shaft is provided at the bottom with a collar 33 which rotatably receives the shaft and is confined by the ball bearing assemblies 34 on the shaft to permit the shaft to turn easily in the collar. A crank arm 35 is pivotally connected to the collar at one end and is pivotally connected at the opposite end to a cam operated lever 36 for raising and lowering the shaft, as will later be described in detail.

Figure 2:
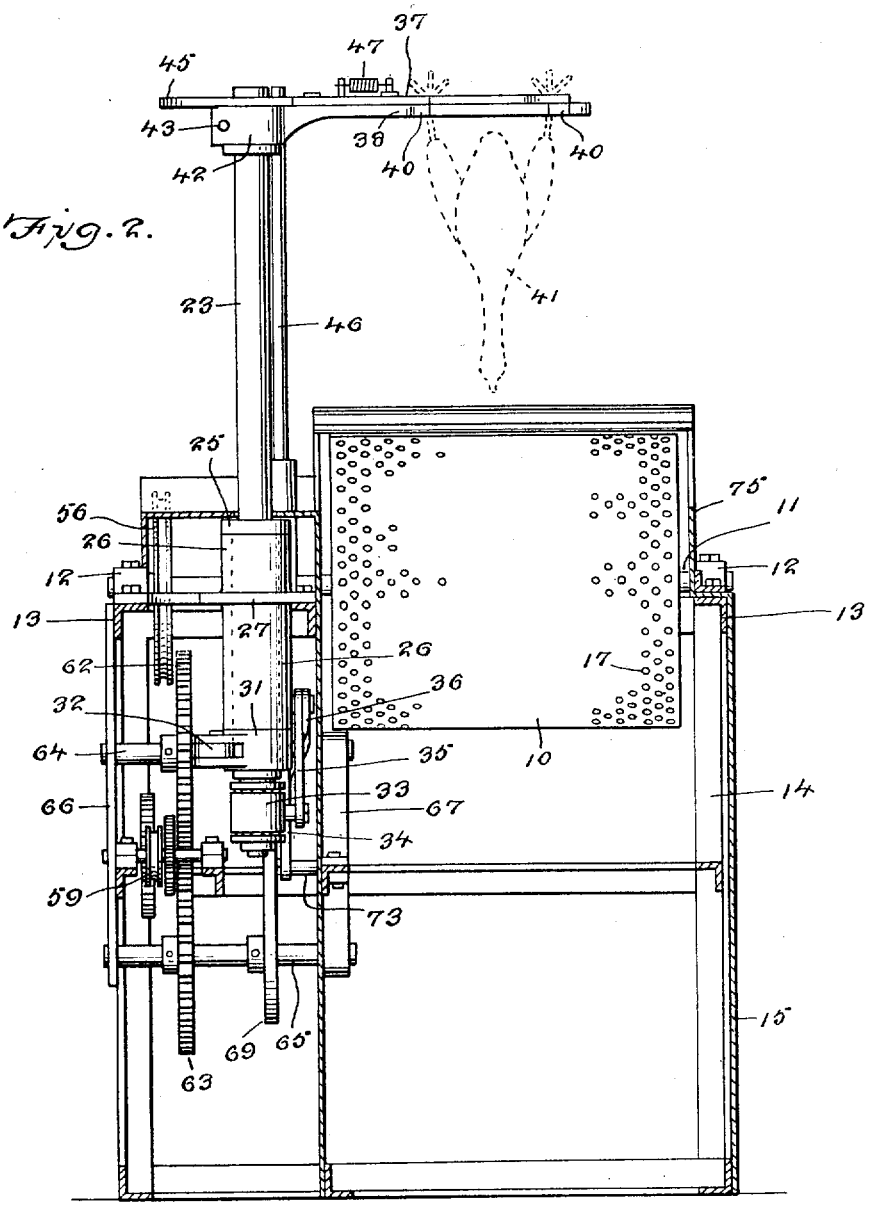
Figure 2 is a vertical sectional view, diagrammatic as respects the stripping drums, taken on the line 2—2 of Figure 1 showing the shaft raised at its upper limit of movement and showing the poultry clamp between and above the stripping rollers.
Figure 3:
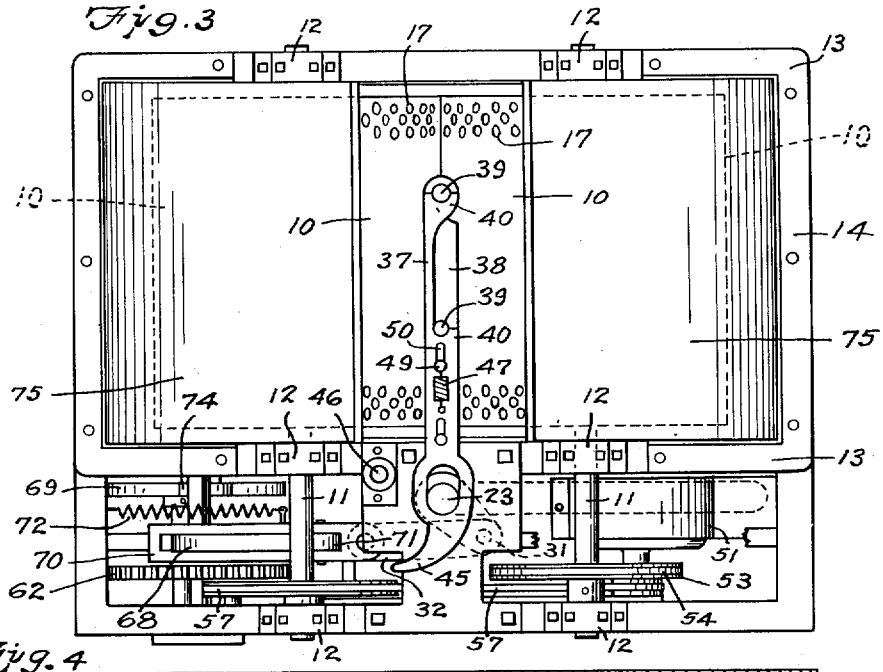
Figure 3 is a plan view, diagrammatic as respects the stripping drums, of the device showing the clamp arm in the position shown in Figure 2.

The poultry clamp is best shown in Figure 8 to comprise a pair of superposed arms 37 and 38, the lower arm being provided with spaced slots 39 opening through one longitudinal edge of the arm, and the upper arm being provided with spaced hooks 40 which co-act with the slots in forming circular openings when the upper arm is slid outwardly on the lower arm, as best shown in Figure 3, to grip the legs of poultry 41, as shown in Figure 2.

The lower arm 38 is provided with a split ring collar 42, best shown in Figures 5 and 6, which is secured to the upper end of the shaft 23 by clamp bolts 43. The upper arm 37 is provided with a longitudinal slot 44 to slidely receive the upper end of the shaft 23 as best shown in Figure 8. Beyond the slot the arm is provided with a curved cam finger 45 which is adapted to engage an abutment rod 46 which extends vertically from the securing flange 27 of the bearing 26.

When the shaft 23 is turned to swing the clamp from a position across the machine above the stripping drums, to a position longitudinally of the frame 14, as shown by dotted lines in Figure 1, the cam finger will strike the abutment rod 46 during the final stage of turning movement and will withdraw the upper arm 37 rearwardly along the lower arm 38 to open the hooks 40 and permit a de-feathered fowl to be replaced with a feathered fowl. When the clamp on shaft 23 is swung back again through an arc of 90°, a helical spring 47 retracts the upper arm outwardly on the lower arm, and, as the cam finger 45 rides off of the abutment rod 46, closes the hooks to securely clamp the feathered poultry by the legs, head downward, for application to the stripping drums. The spring 47 is connected at one end to the upper arm 37 by a pin 48, and is connected at the other end to a pin 49, which is secured to the lower arm 38 and is slidely fitted in a slot 50 formed in the upper arm.

For actuating the stripping drums, an electric motor 51 is mounted on a belt tightener 8 which is secured to the frame 14. The shaft of the motor is equipped with a pulley 52 over which and a pulley 53 on the shaft of one of the stripping drums a crossed belt 54 is trained. Likewise the motor shaft is equipped with a pulley 55 over which and a pulley 56 on the shaft of the other stripping drum a loop belt 57 is trained. When the motor is started both stripping drums will be rotated toward each other, as indicated by the arrow heads in Figure 1.

Figure 4:
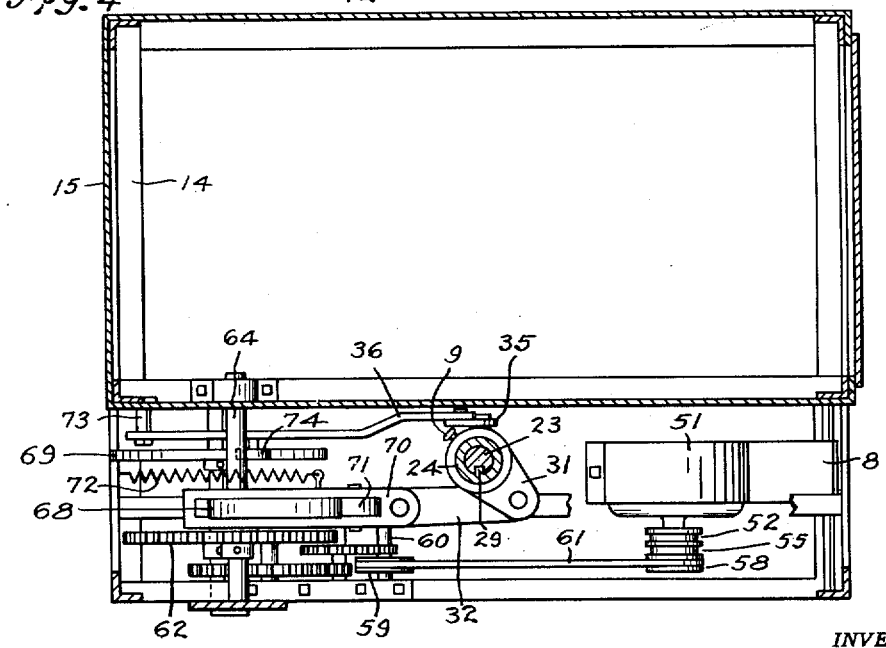
Figure 4 is a cross sectional view taken on the line 4—4 of Figure 1 showing the mechanism for actuating the shaft.

For actuating the raising and lowering mechanism of the clamp carrying shaft 23, and also for actuating the axial turning movement of the shaft, a pulley 58 is secured to the motor shaft and over this pulley and a pulley 59 on a shaft 60 carried by the frame, as shown in Figures 1 and 4, a belt 61 is trained. The shaft 60 forms a driver for two speed reduction gear trains 62 and 63, which need not be described in detail, and which terminate in respective slow speed shafts 64 and 65, as shown in Figures 1 and 2. The shafts 64 and 65 are journaled at the ends in bar-like bearing providing means 66 and 67 which are carried by the frame as shown best in Figure 2. The shafts 64 and 65 drive respective cams 68 and 69, best shown in Figures 5 and 6, for controlling movement of the shaft 23.

The cam 68 is pear-shaped and actuates a cross head 70 which slides upon the shaft 64. The cross head is equipped with a roller 71 which is held by a spring 72 against the edge of the cam 68. The cross head is pivotally connected to the link 32 which rotates the sleeve 24 to impart axial turning movement to the shaft 23.

The cam 69 is kidney-shaped and actuates the lever 36 which raises and lowers the shaft 23. The lever 36 is pivoted at one end, as shown at 73, to the frame and between its pivoted end and its pivotal connection with the link 35 is provided with a roller 74 which rides upon the peripheral edge of the cam.

In operation, due to the respective shapes of the cams, the shaft 23 will have four movements during each complete revolution of the cam shafts 64 and 65, which, it will be pointed out, are driven at the same speed. First the cam 68 will present one of its sloping sides to the roller 71, and move the cross head from the position shown in Figure 5 toward the right of the figure, and will rotate the shaft 23 through 90° to swing the poultry clamp to its operative position above and between the stripping drums 10. Whereupon the concentric peripheral edge of the cam is presented to the roller and the cam is ineffective to rotate the shaft 23, but during this ineffective period of the cam 68 the cam 69 presents its high eccentric peripheral edge to the roller 74 and as the roller rides down the edge the shaft 23 will be lowered to dip the feathered fowl between the stripping drums. The dipping operation may pause slightly while the fowl is lodged between the stripping drums, since the slight curve of the eccentric low side of the cam 69 is presented to the roller 74. As the roller rides up again on the high concentric side of the cam, the roller is raised to lift the shaft 23.

When the shaft 23 arrives at its upper limit of movement the pear-shaped cam 68 has turned to present its other inclined edge to the roller 71 and permit the spring 72 to pull the cross head outwardly and move the link 32 to rotate the shaft 23 and swing the clamp back to a position longitudinally of the machine for replacement of a de-feathered fowl with a feathered fowl.

If desired curved shells 75 may be disposed on the frame to overhang the stripping drums and prevent feathers being carried out of the housing.

From the above description, it is thought that the construction and operation of the invention will be fully understood without further explanation.

What is claimed is:

1. A machine of the character described comprising, a pair of rotatable feather removing beater drums provided with a plurality of radially disposed rubber fingers, each finger having a head formed thereon to prevent it from parting from the drum, said fingers being adapted to beat substantially the entire feathered area of a fowl, means to support a single fowl and subject the same to the action of said drums, said means including a vertically movable shaft, a clamp carried by the upper end of the shaft adapted to suspend poultry by the legs head downward, means for raising and lowering the shaft, and means for intermittently rotating the shaft through an arc of 90° when in its uppermost position.

2. A machine of the character described comprising, a pair of rotatable feather removing beater drums, radially disposed rubber fingers projecting from the drums, said fingers being adapted to beat substantially the entire feathered area of a fowl, means to support a single fowl and subject the same to the action of said drums, said means including a vertically movable shaft, superposed arms having relative sliding movement horizontally on the upper end of the shaft and having coacting recesses adapted to clamp the legs of poultry, spring means for holding said arms in clamping position, cam means for sliding said arms against the tension of the spring means, means for raising and lowering the shaft, and means for intermittently rotating the shaft through an arc of 90° to operate said cam means when the shaft is in its uppermost position.

3. A machine of the character described comprising, a pair of rotatable feather removing beater drums, radially disposed rubber fingers projecting from the drums, said fingers being adapted to beat substantially the entire feathered area of a fowl, means to support a single fowl and subject the same to the action of said drums, said means including a vertically disposed shaft, a sleeve splined to the shaft, a stationary bearing for mounting the sleeve, cam means connected to the sleeve for intermittently rotating the sleeve, a collar rotatably mounted on the bottom of the shaft, cam means connected to the collar for raising and lowering the shaft, the arrangement being such that the shaft is rotated by the sleeve before and after vertical movement of the shaft, superposed arms having relative sliding movement horizontally on the upper end of the shaft and having coacting recesses adapted to clamp the legs of poultry, spring means for holding said arms in clamping position, a cam finger carried by one of the arms, and an abutment adapted to engage said cam finger when the arms are swung to their limit of movement in one direction for sliding said arms against the tension of the spring means to release the poultry.

4. In a mechanical poultry picker, a fowl supporting means for supporting a fowl in hanging position, a fowl picker means of the striker type for picking a fowl, comprising a pair of rotatable members, each provided with flexible fingers; mechanism for rotating the said members in opposite directions with the fingers on the surfaces of said members adjacent said fowl supporting means approaching each other, means for moving the fowl supporting means to positions directly above the fowl picking means and then moving it away; and means vertically reciprocating one of said means toward and from said fowl picking position synchronized to operate when the fowl is hung directly above the fowl picking means.

5. A mechanical fowl picker device of the striker type comprising a means consisting of a pair of rotatable members, each rotatable member being provided with flexible fingers; a fowl supporting means for freely supporting a fowl in depending position between said rotatable members; mechanism for rotating the said members in opposite directions with the fingers on the surfaces of said members adjacent said fowl supporting means approaching each other and simultaneously beating and flexing when contacting the depending fowl, whereby the beating force applied to the fowl is distributed to both sides of the fowl; and means providing relative vertical movement between the fowl supporting means and the picking means, whereby a fowl is moved into and out of picking position.

6. A mechanical fowl picker device of the striker type comprising a means consisting of a pair of rotatable members; a fowl supporting means for freely supporting a fowl in depending position between said rotatable members; means for vertically reciprocating one of said means to and from fowl picking position; flexible fingers mounted on said rotatable members for contacting a fowl with positive inward and downward pressures while said fowl is supported by said fowl supporting means; and mechanism for rotating the said members in opposite directions with the fingers on the surfaces of said members adjacent said fowl supporting means approaching each other and simultaneously beating and flexing when contacting the depending fowl, whereby the beating force applied to the fowl is distributed to both sides of the fowl.

7. A mechanical fowl picker device of the striker type comprising a means consisting of a pair of rotatable members arranged on horizontal axes; a fowl supporting means for freely supporting a fowl in depending position between said rotatable members; means for vertically reciprocating one of said means to and from fowl picking position; flexible fingers mounted on said rotatable members for contacting a fowl with positive inward and downward pressures while said fowl is supported by said fowl supporting means; mechanism for rotating the said members in opposite directions with the fingers on the surfaces of said members adjacent said fowl supporting means approaching each other and simultaneously beating and flexing when contacting the depending fowl, whereby the beating force applied to the fowl is distributed to both sides of the fowl; and means for moving the fowl supporting means to and from position above the fowl picker means.

8. A mechanical fowl picker device of the striker type comprising a means consisting of a pair of rotatable members; a fowl supporting means for moving a fowl into and out of picking alignment with said rotatable members and for freely supporting a fowl in depending position between said rotatable members; means for vertically reciprocating one of said means to and from fowl picking position; flexible fingers mounted on said rotatable members for contacting a fowl with positive inward and downward pressures while said fowl is supported by said fowl supporting means; and mechanism for rotating the said members in opposite directions with the fingers on the surfaces of said members adjacent said fowl supporting means approaching each other and simultaneously beating and flexing when contacting the depending fowl, whereby the beating force applied to the fowl is distributed to both sides of the fowl.

EDDY E. McMAHAN.
ANTOINE CHARLEBOIS.